UNITED STATES PATENT OFFICE.

STANLEY CHARLES CUTHBERT CURRIE, OF PHILADELPHIA, PENNSYLVANIA, ASSIGNOR TO THE UNITED ELECTRIC IMPROVEMENT COMPANY, OF GLOUCESTER CITY, NEW JERSEY.

ART OF MAKING CORES FOR ELECTRO-MAGNETS.

SPECIFICATION forming part of Letters Patent No. 421,067, dated February 11, 1890.

Application filed June 1, 1889. Serial No. 312,850. (No specimens.)

*To all whom it may concern:*

Be it known that I, STANLEY CHARLES CUTHBERT CURRIE, a subject of the Queen of Great Britain, but now residing at the city of Philadelphia, in the county of Philadelphia and State of Pennsylvania, have invented certain new and useful Improvements in Cores for Electro-Magnets, of which the following is a specification.

The principal object of my invention is to provide a cheap, comparatively inexpensive, and effective core for a magnet for the armatures and fields of dynamo-machines and for other uses or purposes.

Another object of my invention is to avoid the so-called "Foucault currents" in cases where there are constant changes or reversals of the current in the coils.

Heretofore the principal method resorted to for avoiding the said induced currents has been to build up the cores of a considerable number of disks of iron insulated from one another.

My invention consists, first, in providing a core for a magnet of a compact mass of iron in granular form—such as iron chips, filings, or shaving—in the manner to be hereinafter more particularly described.

My invention consists, secondly, of a core for an electro-magnet formed by mixing or combining with iron filings, chips, or shavings an insulating substance or material in a granular or liquid form, and which after pressure and drying is caused to assume a compact mass.

My invention consists, thirdly, of a core for a magnet formed by mixing or combining with iron filings, chips, or shavings an insulating substance or material—such as silicate of soda—with or without asbestus in a powdered, granulated, or finely-divided form.

A convenient manner of carrying my invention into effect is as follows: A certain quantity or percentage of iron clippings, filings, chips, or shavings are mixed or combined with a solution of silicate of soda, either with or without a certain quantity or percentage of powdered asbestus, and the mass or compound is then subjected to pressure in a suitable appliance and allowed to dry for use as a core for an electro-magnet. The iron filings, chips, or shavings may previous to their admixture or combination with the solution of silicate of soda, or with powdered or granulated asbestus, or both, be subjected to a treatment to cause the surfaces of said chips, filings, or shavings of iron to become coated with a salt or salts of the metal, they being bad conductors of electricity. The iron chips, filings, or shavings may be simply oxidized in any suitable manner. In some cases the coating of the chips, filings, or shavings with the salt or salts of the metal alone will be found sufficient when the filings are pressed tightly together without the addition of any further material to electrically insulate said chips, filings, or shavings from one another.

Having thus described the nature and objects of my invention, what I claim as new, and desire to secure by Letters Patent, is—

1. A core for a magnet, &c., composed of iron filings, chips, or shavings and a silicate, substantially as and for the purposes set forth.

2. A core for a magnet, &c., composed of iron filings, chips, or shavings, a silicate, and asbestus, substantially as and for the purposes set forth.

3. A core for a magnet, &c., composed of iron filings, chips, or shavings, silicate of soda, and asbestus, substantially as and for the purposes set forth.

In witness whereof I have hereunto set my signature in the presence of two subscribing witnesses.

STANLEY CHARLES CUTHBERT CURRIE.

Witnesses:
GEO. W. REED,
THOMAS M. SMITH.